Oct. 9, 1951 — W. N. URIE — 2,570,888
AUTOMATIC LENS DIAPHRAGM CONTROL
MECHANISM FOR PROCESS CAMERAS

Filed Aug. 15, 1947 — 4 Sheets-Sheet 1

INVENTOR.
WILLIS N. URIE
BY
—ATTORNEY—

Oct. 9, 1951

W. N. URIE 2,570,888

AUTOMATIC LENS DIAPHRAGM CONTROL
MECHANISM FOR PROCESS CAMERAS

Filed Aug. 15, 1947

INVENTOR.
WILLIS N. URIE
BY Lynn A. Latta
ATTORNEY

Oct. 9, 1951     W. N. URIE     2,570,888
AUTOMATIC LENS DIAPHRAGM CONTROL
MECHANISM FOR PROCESS CAMERAS
Filed Aug. 15, 1947     4 Sheets-Sheet 3
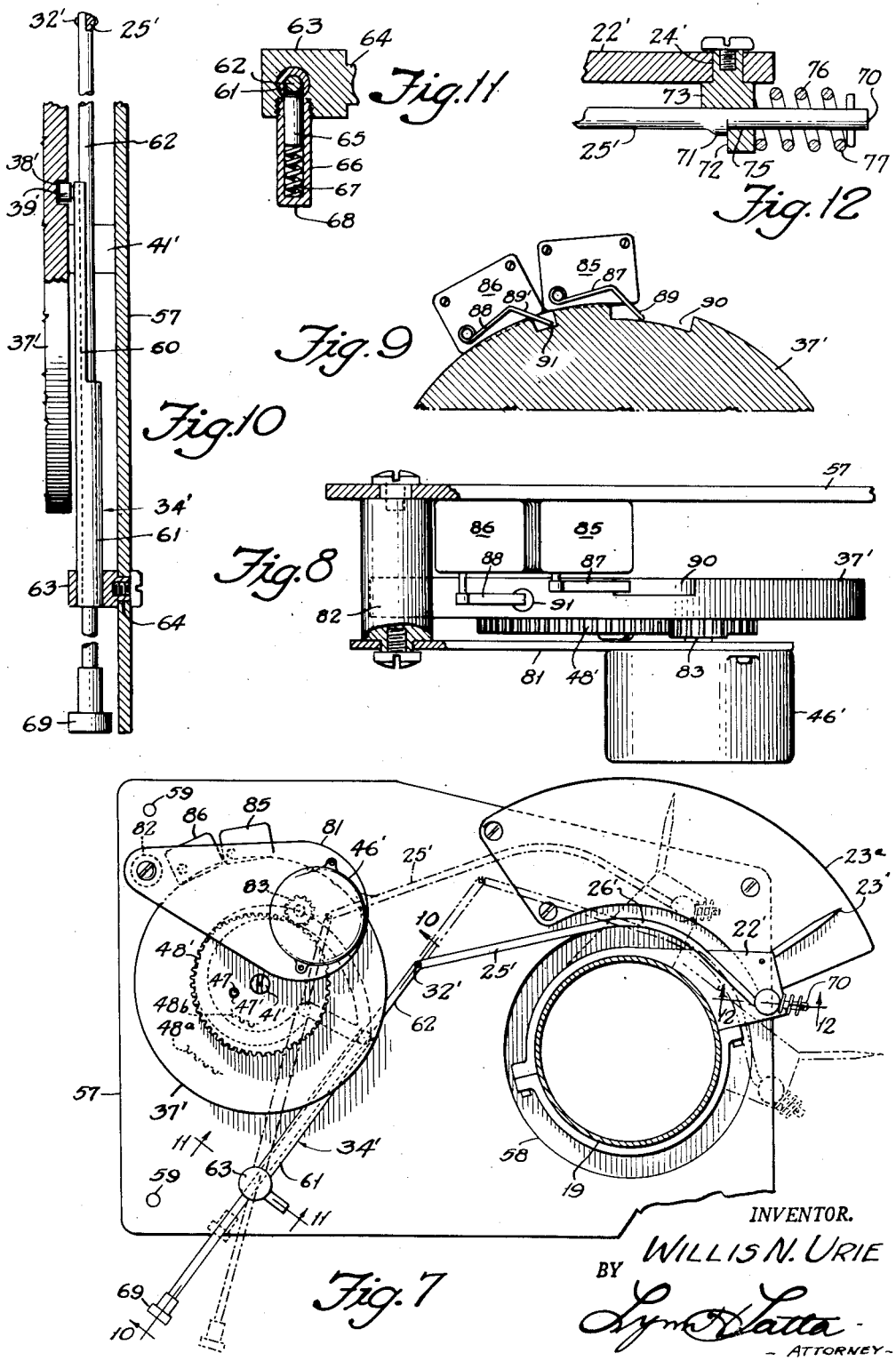
INVENTOR.
WILLIS N. URIE
BY
Lynn Latta
ATTORNEY INVENTOR.
BY WILLIS N. URIE
Lynn H. Latta -ATTORNEY Patented Oct. 9, 1951

2,570,888

UNITED STATES PATENT OFFICE 2,570,888

AUTOMATIC LENS DIAPHRAGM CONTROL MECHANISM FOR PROCESS CAMERAS

Willis N. Urie, Santa Monica, Calif.

Application August 15, 1947, Serial No. 768,840

1 Claim. (Cl. 95—64)

This invention relates to process and photo engraving cameras and has as its general object to provide control mechanism for automatically producing an infinitely variable progressive adjustment of a lens aperture during an exposure.

The invention relates particularly to the making of half tone negatives in a process camera, and with the problem of properly correlating the various tone values of the negative. In the photographing of a subject through a screen in order to produce a half tone negative from which photoengraving or other printing plates can be made, an aperture of a given size will correctly expose only one range of tone values. For example, an aperture set for middle tones will correctly expose such middle tones but will not properly expose the highlights and shadows. A larger aperture will be required for correct exposure of the highlights, and a smaller aperture will be required for correct exposure of the shadows. Furthermore, the highlights require a short period for correct exposure and for correct exposure of the shadows, a long exposure period is required.

It is known that the results attainable by photograping a subject through an aperture of unchanging diameter can be improved upon by dividing the exposure into a succession of stages in which the size of the aperture is progressively varied. So far as I am aware, however, the only known methods of accomplishing this result are (a) to progressively change the aperture setting manually, (b) to employ a step by step mechanism which can be adjusted to start at a selected f stop, and remain at that stop for a predetermined interval of time, then shift to an intermediate f stop, remain at that stop for a predetermined interval, and repeat this step by step change until the desired range of movement has been covered, and (c) to employ a mechanism for continuous closing, but at a constant rate.

Manual operation, of course, depends purely upon the skill of the operator and cannot possibly be uniformly accurate. The step by step mechanism, on the other hand, only approximates the maximum effect that is possible by a continuous, infinitely variable change in the aperture setting throughout the entire cycle of operation. The constant rate continuous mechanism, although an improvement on the other two, does not give the correct duration of exposure for each tone value.

With the foregoing in mind, the primary object of my invention is to provide a mechanism which will automatically produce a continuous, infinitely variable change in the aperture setting.

However, it is not sufficient merely to provide for infinitely variable change. The rate of change at various stages in a complete cycle of operation must be properly proportioned in order to get optimum results. Accordingly, a second object of my invention is to provide a mechanism adapted to produce a continuous, infinitely varying change in lens aperture setting, at a rate of change which is so proportioned to increments of exposure period in a cycle of operation, as to produce optimum results.

Magnitude of exposure as used herein, refers to the total quantity of light passed to the film, as determined by both the size of the lens aperture and the duration of exposure.

Teh average brightness or darkness of subjects of process photographing will of course vary. Where the subject is light, an exposure of low magnitude may be used. When the subject is dark, an exposure of greater magnitude will be required. Furthermore, a change in magnitude of exposure may be required for the purpose of adjusting for enlargements or reductions from a given subject. A further object of my invention is to provide a shutter control mechanism which can be adjusted for exposures of various magnitudes and which will operate to effect infinitely variable change of lens aperture at a rate of change bearing in each case substantially the same proportion to the period of exposure, regardless of the magnitude of exposure.

While the invention contemplates the possibility of effecting all changes in exposure magnitude by varying the period (total time) of exposure, and does provide for selectively adjusting the period for radical changes in conditions of use of the apparatus, I find that for normal adjustments for varying tone values, it is not only feasible, but desirable, to maintain the exposure period constant, and to effect the adjustment of exposure magnitude by changing the average aperture size. This is accomplished by selecting one portion of the total range of aperture adjustment in which to operate the apparatus for one set of exposure conditions, and another portion of such range for another set of conditions. I find that a satisfactory extent of variation of aperture size for any given exposure is a change of two f stops. Accordingly, a further object of my invention is to provide a mechanism which may be set to change the lens aperture through a predetermined number of f stops in any selected portion of the entire range of f stops.

Development of the mechanism of my invention followed upon the concept that a considerable improvement in the sharpness of tone values in a half tone negative could be attained in any number of cases involving varying conditions of lighting, etc., by employing the following method:

(a) Selecting a range of two f stops as a total range of lens adjustment for any particular exposure;

(b) Shifting this range of two f stops to selected positions in the total range of lens adjustment of the process camera being used;

(c) Selecting a formula for the relation between increments of aperture change and corresponding increments of exposure time, such as to provide optimum results for the average exposure;

(d) Providing mechanism for automatically infinitely varying the lens aperture in a continuous movement throughout the entire exposure period, in accordance with the selected proportioning formula; and (e) Providing for operation of such mechanism in any of the selected portions of the total range of possible aperture adjustment.

Accordingly, a further object of my invention is to provide this method of producing half tone negatives having sharper tone values than those produced by any presently known process. A further object is to provide an apparatus adapted to operate in accordance with such a method.

Other objects will become apparent in the ensuing specification and appended drawings in which:

Fig. 7 is a front view of a modified form of the invention;

Fig. 8 is a plan view of the timing cam and associated parts, of Fig. 7;

Fig. 9 is a detail sectional view of the upper portion of the timing cam and micro switches;

Fig. 10 is a detail sectional view taken on the line 10—10 of Fig. 7;

Fig. 11 is a detail sectional view taken on the line 11—11 of Fig. 7;

Fig. 12 is a detail sectional view taken on the line 12—12 of Fig. 7;

Figure 1:
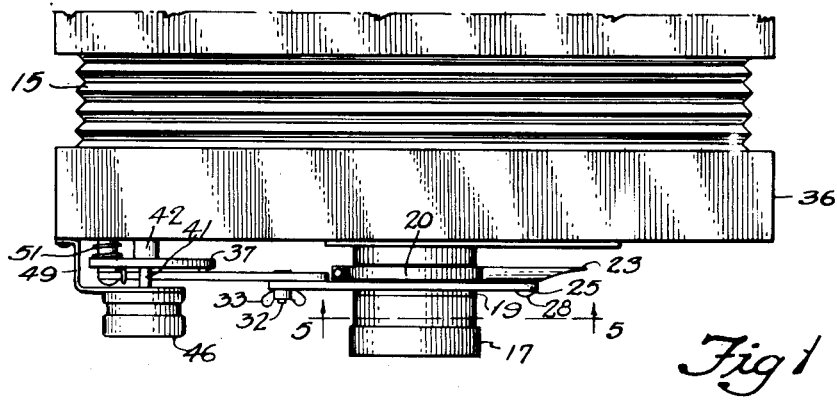
Fig. 1 is a plan view of the forward portion of a process camera with my invention applied thereto.

As an example of one form in which my invention may be embodied, I have shown in Figs. 1 to 6 inclusive, a process camera embodying a bellows 15, a base 16 on which the bellows 15 is adjustably mounted, and a lens holder 17 having a lens 18 therein and including a rotatable diaphragm holder 19 which, when rotated, adjusts the size of the lens aperture therein. Since such mechanism is well known and in common use, the details thereof are not disclosed herein.

Figure 2:
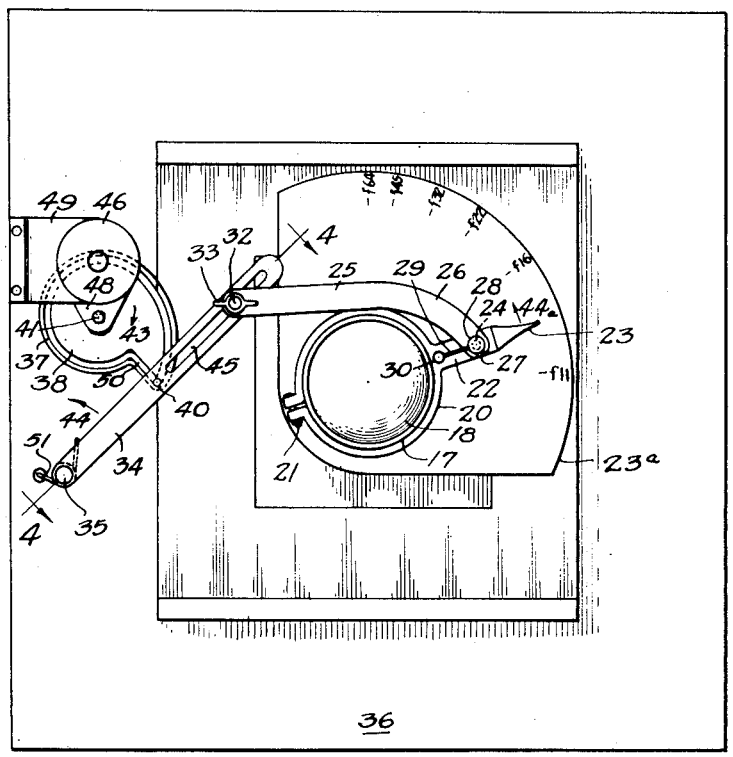
Fig. 2 is a front view of the same.
Figure 3:
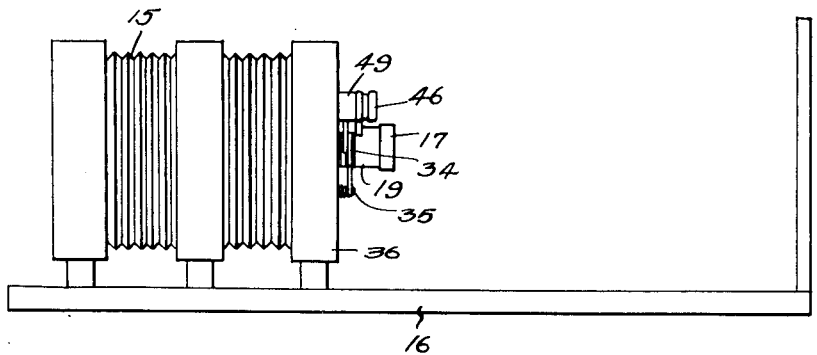
Fig. 3 is a side view of the entire camera setup.
Figure 4:
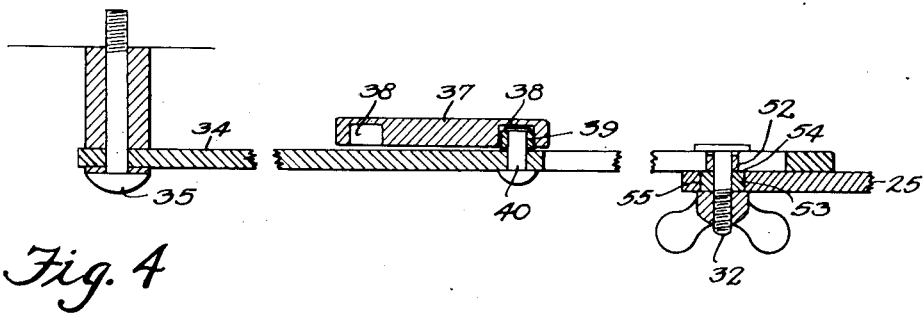
Fig. 4 is a detail sectional view taken on the line 4—4 of Fig. 2.
Figure 6:
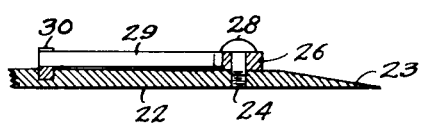
Fig. 6 is a detail sectional view taken on the line 6—6 of Fig. 5.
Figure 5:
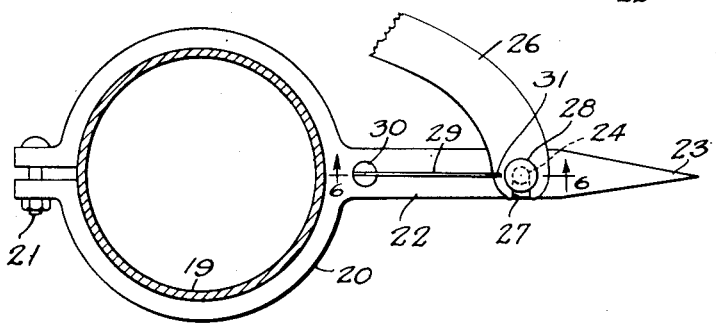
Fig. 5 is a detail sectional view taken on the line 5—5 of Fig. 1.

My invention provides mechanism for adjusting the diaphragm holder 19, such mechanism including a split collar 20 having clamp means 21 for securing the same in frictional engagement with, and encircling, the diaphragm holder 19. On one side the collar 19 has an extension which provides a crank arm 22 and a pointer 23 on the outer end thereof. The pointer 23 cooperates with a dial 23a which, as shown in Fig. 2, bears indicia for locating the f stop positions of lens aperture adjustment. The position of maximum aperture size indicated in Fig. 2 is the f11 position, and the position of minimum aperture size is the f64 position. The drawing shows, in full lines, the diaphragm holder adjusted to a large aperture position, from which it may move, counterclockwise as indicated by arrow 44a, to reduce the aperture.

A pivot stud 24 is mounted in the arm 22. A connecting link 25 has a curved end portion 26, the end of which is slotted at 27 to receive the stud 24 and is confined between the crank arm 22 and the head 28 on the stud 24. A leaf spring 29, one end of which is secured in a slotted stud 30 that is mounted in the arm 22, has its other end set into a slot 31 in the edge of the curved end portion 26, and functions to yieldingly maintain the stud 24 bottomed in the slot 27, and to provide for overtravel. The other end of the link 25 is connected, through a stud 32 and wing nut 33 threaded thereon, to a swinging end of a movement multiplying lever 34. The other end of the lever 34 is pivoted upon a stud 35 that is mounted in the camera head 36. Intermediate the pivots 35 and 32, the lever 34 receives movement from a cam 37 through a cam groove 38 therein, a roller 39 travelling in the groove 38, and a stud 40 mounted in the lever 34, on which stud the roller 39 is journalled. The cam 37 is mounted on the camera head 36 for rotation on a fixed axis. Such mounting may, for example, comprise a shaft 41 journalled in a bearing 42 carried by the head 36. The cam 37 rotates in a clockwise direction as indicated by arrow 43. The cam groove is spiral shaped and has a constantly decreasing pitch from its outer to its inner end, so that the movement transmitted by it to the lever 34 is a decelerating leftward movement as indicated by arrow 44. The decelerating characteristic has an important function which will be described hereinafter.

The screw 32 is slidably mounted in a slot 45 in the lever 34. The slot 45 is inclined at a substantial angle with reference to a tangent to an arc struck from the center of the stud 24. Consequently, one effect of shifting the screw 32 in the slot 45 is to change the angular position of the arm 22. Another effect is to vary the effective length of the outer arm of lever 34 (from stud 40 to screw 32) and thereby to vary the degree of multiplication of movement by the lever 34. For example, when the pivotal connection between the link 25 and lever 34 is near the outer end of the latter, the total amount of movement imparted to the diaphragm holder in one complete revolution of the cam 37 will be greater than when the pivotal connection is shifted nearer to the stud 40. Thus the amplitude of adjustment of the diaphragm holder is varied progressively from a maximum where the starting position is at the maximum lens aperture position of adjustment, to a minimum for the minimum lens aperture starting position. For each cycle of operation, however, the rate of deceleration of the automatic adjusting movement will be substantially the same, since the rate of deceleration is controlled mainly by the cam 37. The deceleration rate as determined by the cam will be modified by variations in the rate of transmission of movement from the cam to the diaphragm holder, as follows:

(a) A secondary deceleration factor arising from the increase in the effective length of the arm 22 as it is moved in the counterclockwise direction; and (b) An acceleration factor arising from the increase in effective length of the lever 34 as it moves in the counterclockwise direction, and varying in magnitude in accordance with changes in the multiplication ratio of the lever 34. Where the apparatus is set for operation in a large aperture (low number f stop) range (as in the full line showing of Fig. 2) the rate of change of the effective length of the arm 22 (and therefore the secondary deceleration factor) will be relatively high and the acceleration factor will be correspondingly high because of the high multiplication ratio of lever 34. On the other hand, where the apparatus is set for operation in a small aperture (high number f stop) range (as in the dotted line showing of Fig. 2) the secondary deceleration factor will be relatively low and the acceleration factor will be correspondingly low (by reason of the lowered multiplication ratio resulting from movement of the pivot 32 close to the pivot 35). It will now be apparent that the ratio between these two factors (a) and (b) will tend to remain constant in all positions of adjustment, irrespective of whether that ratio is unity or a substantial quantity. Furthermore, it is more important to maintain this ratio substantially constant, than to achieve a ratio of unity, since an element of either acceleration or deceleration of movement imparted by the linkage can be compensated for in the design of the cam 37 so as to attain the net deceleration of the arm 22 which is required in order that the total amplitude of movement of the arm 22 may, in one full cycle of operation, equal exactly two f stop intervals either in the low number f stop range where the intervals are relatively long, or in the high number f stop range where the intervals are relatively short. By maintaining the ratio between (a) and (b) substantially constant, the deceleration rate will remain substantially constant and proportional to the rate determined by the cam 37, in all positions of adjustment of the pivot 32 in the slot 45. At the same time, the starting position of the arm 22 may be varied simply by loosening the thumbnut 33 and sliding the pivot 32 in the slot 45, due to the inclined position of the lever 34.

Since the progressive movement of the diaphragm holder is a decelerating one, the duration of each successive increment of exposure for equal reductions in aperture size, will progressively increase. The rate of deceleration is such as to proportion the extent of diaphragm closing to the elapsed exposure time as follows:

| Percentage of diaphragm closing | Elapsed exposure time—percentage of total exposure |
| --- | --- |
| 0 | 0 |
| 36 | 6.67 |
| 60 | 20 |
| 84 | 46.67 |
| 100 | 100 |

From the foregoing it will be obvious that 36% of the diaphragm closing will occur in less than 7% of elapsed exposure time, that 60% of diaphragm closing will occur in 20% of the total exposure period, and that 84% of closing movement will occur in less than half of the exposure period. As a specific example, assuming that the total exposure period is 225 seconds and that the linkage is adjusted to bring the pointer 23 to the f11 starting point, the positions of the pointer 23 at the following intervals of elapsed exposure time will be as follows:

| Position of pointer | Elapsed exposure time |
| --- | --- |
| ½ stop between f11 and f16 | 15 seconds. |
| f16 | 45 seconds. |
| ½ stop between f16 and f22 | 1 minute, 45 seconds. |
| f22 (end of cycle) | 3 minutes, 45 seconds. |

This proportioning of diaphragm closing to elapsed exposure time causes the apparatus to operate in a manner to produce half tone negatives having sharp tone values, and having a complete range of tone values.

Adjustment of the linkage, as described above, will provide sufficient adjustment of total exposure to meet variations in exposure conditions normally encountered in conventional process photo practices. In the event that unusual conditions are presented, that cannot be fully met by such adjustments, or in the event that the camera is put to an unusual type of usage, it is possible to change the timing of the apparatus by changing the drive mechanism. Such drive mechanism embodies a small fractional horsepower, constant speed electric motor 46 connected to the shaft 41 of the cam 37 by a reduction drive 48. The drive ratio of the reduction drive 48 can be changed by replacing the gears thereof with gears of different ratio. The motor 46 is mounted on the camera head 36 in any suitable manner, as by means of a bracket 49.

The inner and outer ends of the cam groove 38 are connected by a radial groove 50 which permits the linkage to shift instantly from its terminal position back to the starting position when the cycle of diaphragm closing movement has ended. A spring 51, one end of which is anchored to the front panel 36 and the other end of which is hooked around the upper side of the lever 34, constantly exerts yielding pressure against the lever in the clockwise direction and functions to move the linkage back to the starting position.

Any desired adjustment in the relationship between the arm 22 and the rest of the linkage can be effected by loosening the bolt 27 and rotating the ring 20 upon the diaphragm holder 19.

Means for clamping the pivot 32 in fixed relation to the lever 34 without interfering with the pivotal movement of the arm 25 with relation to the lever 34, comprises (Fig. 4) the sleeve 52 through which the pivot 32 extends. The sleeve 52 is received in the slot 45 and its diameter is just slightly less than the width of the slot 45 so that it may freely slide in the slot when the thumbnut 33 is loosened, and at the same time cooperate with the slot to maintain the pivot 32 centered with relation to the longitudinal axis of the lever 34. The sleeve 52 has an enlarged head 53 which defines a shoulder 54 that engages the forward face of the lever 34. The head 53 is received in a bore 55 in the arm 25, and pivots therein during the movement of the linkage. The depth of the head 53 is slightly greater than the thickness of the arm 25, so that the head 53 may be clamped securely in frictional engagement with the lever 34, to fix the position of the pivot 32 while leaving the arm 25 free to swing about the pivot without being frictionally engaged between the thumbnut 33 and the lever 34. The collar portion of the thumbnut 33 is slightly larger in diameter than the head 53, so that the arm 25 is loosely confined between the thumbnut and the lever 34.

The length of the sleeve 52 is slightly less than the thickness of the lever 34. The screw 32 has a head 56 which engages the rear side of the lever 34. It will now be apparent that the thumbnut 33 may be tightened to clamp the head 53 and lever 34 between the thumbnut and the screw head 56, thereby securely locking the pivot sleeve 52 to the lever 34 while leaving the arm 25 free to pivot around the head 53.

Modified form

Figs. 7, 8, 9, 10, 11 and 12 illustrate a modified form of the invention which, although the same in principle as the apparatus just described, incorporates certain improvements which will now be described.

In this form, all of the mechanism of the invention is mounted upon the mounting plate 57 which has an opening 58 to receive the lens holder and the diaphragm holder 17, 19, and which may be attached to the camera head 36 by suitable screws or other securing elements extended through openings 59 therein.

The cam 37' is rotatably mounted on a stud 41' fixed in the plate 57. The cam groove 38' is in the rear side of the cam. The lever 35' is constructed from a length of tubing having one end split along its axis and one-half of the split portion removed to leave a semi-cylindrical extension 60, the remainder of the lever comprising a tubular portion 61 which forms a bearing for a rod 62 that is slidably mounted therein. The end of the slide bearing 61 is mounted in a stud 63 having a pivotal connection at 64 (Figs. 10 and 11) with the mounting plate 57. A frictional connection between the rod 62 and lever 34' is established by a shoe 65 in the form of a pin slidably mounted in a hollow boss 66 carried by the stud 63, and yieldingly urged into frictional engagement with the rod 62 by a spring 67 which is under compression between the shoe 65 and an end member 68 in the boss 66.

On one end of the rod 62 is a knob 69 by which the rod is manipulated. The other end of the rod 62 is pivotally connected, at 32', to a link 25'. The link 25' has an arched portion 26' adapted to extend around the periphery of the diaphragm holder. The link 25' terminates in an end portion 70 which is aligned with the pivot 32'. Intermediate the end portion 70 and arched portion 26' is a shoulder 71 which is adapted to normally engage an abutment face 72 on a stud 73 that is pivoted at 24' in the arm 22'. The end portion 70 of the link 25' extends through an opening 75 in the stud 73, and is acted upon by a coil spring 76 under compression between the stud 73 and a pin 77 in the end thereof, to yieldingly maintain the shoulder 71 in engagement with the stud 73. The abutment face 72 intersects the axis of the pivot 24', and is formed by cutting away half of the outer end of the stud. The construction just described provides for overtravel of the link 25' beyond a limit of movement of the diaphragm holder which is ordinarily established at the highest f stop position to prevent movement of the holder beyond that position. Should the operator inadvertently adjust the mechanism to a setting beyond which the mechanism cannot move a full two f stop intervals, such overtravel will permit the apparatus to complete its cycle of movement without jamming. Normally, the spring 76 will maintain the shoulder 71 in engagement with the abutment face 72, thereby preserving the correct spacing between the pivots 32' and 24'.

Movement is transmitted to the lever 34' by the cam 37' through a roller 39' engaging in the groove 38' and mounted upon a stud 40' secured in the extension 60 of the slide bearing 61.

The frictional connection between the rod 62 and lever 34' makes it possible to adjust the effective length of the lever 34' to any desired value within predetermined limits, by simply grasping the head 69 and sliding the rod 62 in the bearing 61. A one-handed manipulation of this adjustment is made possible by this particular construction.

The rod 62 has a total range of adjustment from the position shown in full lines in Fig. 7 to a position in which the pivot 32' lies closely adjacent the end of the slide bearing 61, as indicated in dotted lines in Fig. 7. The extension 60 is offset to one side of the bore of the bearing 61 in order to permit the link 25' to clear it as the pivot 32' moves to this position. It will now be apparent that this form of the invention provides for a greater range of adjustment than the previously described form, for the reason that pivot 32' may completely pass the point of connection to the cam 37'. Adjustment to this range of positions may be utilized to provide an aperture of fixed minimum size for photographing line drawings, etc.

The drive motor 46' is mounted upon one end of a motor base 81 the other end of which is pivoted upon a post 82 mounted in the mounting plate 57. The shaft of the motor 46' carries a drive pinion 83 which meshes with a driven gear 48' detachably mounted on the outer face of the cam 37'. The gear 48' may be drivingly connected to the cam 37' in any suitable manner, as by means of a screw 83a extending through an opening 84 in the gear 48' and threaded into cam 37'. The pinion 83 is maintained in mesh with the gear 48' by the weight of the motor 46' resting thereon, the entire motor mounting arm 81 being freely pivotal around the post 82. The distance between the post 82 and the drive pinion 83 is substantially the same as the distance between the post 82 and the cam center 41', so that the gear 48' may be replaced by a larger or smaller gear 48a or 48b (indicated in dotted lines in Fig. 7), in order to change the ratio of the drive. 48a indicates a gear of maximum size and 48b indicates a gear of minimum size, and it will be understood that gears of any number of intermediate sizes may be selected. In each case, the pinion 83 has a gravity urged driving connection with whichever gear is applied to the cam. The gear 48' may be detachably connected to the cam 37' by a cap screw 41' and has a driving connection with the cam comprising a pin 47 mounted in the cam and engaged in an opening 47' in the gear 48'.

Automatic control mechanism for the apparatus includes a pair of micro switches 85 and 86 mounted on the mounting plate 57 and having operating arms 87 and 88 each provided with a finger portion 89 bent so as to ride normally upon the periphery of the cam 37' at an acute angle which is preferably about 45 degrees. The mechanism of the switches 85, 86 (of conventional construction and therefore not shown in detail) yieldingly urges the fingers 89, 89' into engagement with the cam periphery. In the periphery of the cam 37' is a circumferentially elongated recess 90 into which the finger 89 of the arm 87 may drop, resulting in the opening of the switch 85. Also in the periphery of the cam 37', forwardly of the claim of the recess 90, is a hole 91 into which the finger 89' of the arm 88 may drop, resulting in opening of the switch 86.

Figure 13:
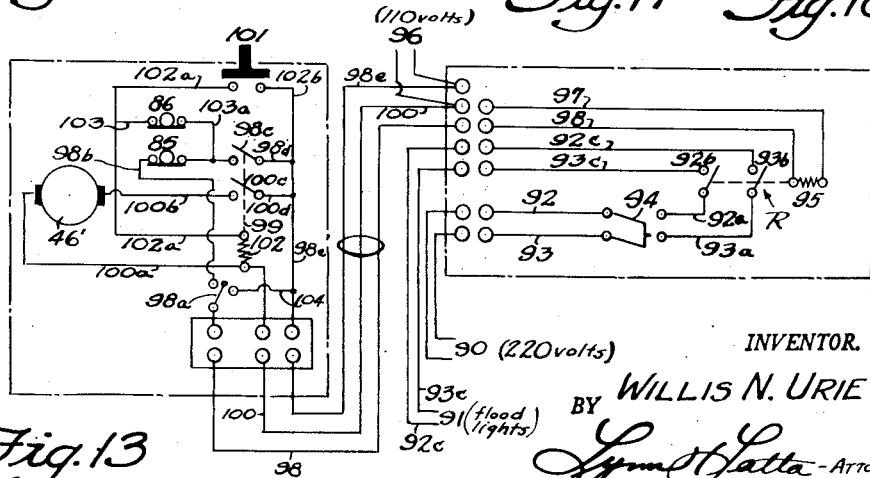
Fig. 13 is a wiring diagram of the electrical parts of the mechanism.

Referring now to Fig. 13, illustrating a wiring diagram of the control mechanism, means for conducting 220 volt current from a source 90 to the flood lights 91 with which the subject to be photographed is illuminated, includes a pair of conductors 92 and 93, a double pole manual switch 94, conductors 92a and 93a, switches 92b and 93b, of a relay R, and conductors 92c and 93c. The relay R is of the self-opening type, i. e., is normally open. It has an energizing coil 95 which is adapted to be energized from a source of 110 volt current 96 through a circuit including conductors 97 and 98, a manual switch 98a, a conductor 98b, the microswitch 85, a switch 98c of a holding relay 99, and conductors 98d and 98e. The motor 46' is energized from the 110 volt source 96 through a circuit including conductors 100, 100a and 100b, a switch 100c of the relay 99, a conductor 100d, and the conductor 98e. The relay 99 is self-opening, i. e., is normally open. It is closed, to start the motor circuit, by means of a starting switch 101 which controls the circuit to the energizing coil 102 of the relay 99, such energizing circuit including conductor 100, conductors 102a and 102b, and the conductor 98e. In starting, the switch 101 is held depressed until the operation of the motor rotates the cam 37' sufficiently to withdraw the finger 89' of the arm 88 from the hole 91 in the cam 37', thus closing the microswitch 86. This establishes a holding circuit including conductor 100, relay coil 102, conductor 102a, a conductor 103, microswitch 86, a conductor 103a, relay switch 98c, and conductors 98d and 98e, which holding circuit is shunted across the starting switch 101, and maintains relay coil 99 energized for one cycle of operation.

It is to be understood that the invention contemplates the use of this same control mechanism with either the apparatus shown in Figs. 1–6 inclusive, or the apparatus shown in Figs. 7–12 inclusive. However, I will refer particularly to Figs. 7–13 inclusive in describing the operation.

The manual switch 94 constitutes a master switch or safety switch that must be closed in order to connect the apparatus to the 220 volt circuit 90. With this switch closed, the apparatus is ready for operation. Preliminary to making an exposure, the operator may illuminate the subject by shifting the manual switch 98 (which is a double-throw switch) over to a shunt circuit including a conductor 104 which shunts out the automatic light control switches 85 and 98c. This will of course be done prior to the insertion of the film into the camera. Having properly focussed the camera upon the subject and made any necessary calculations for light intensity, the operator proceeds to shift the switch 98a back to the conductor 98b, thus setting up the automatic light control circuit. The operator will then, based upon the calculations for light intensity, grasp the knob 69 and push or pull the rod 62 to adjust the arm 22' to the selected starting position. The cam 37' will rest in the position shown in Fig. 7, with the light switch 85 and motor control switch 86 open in the positions in which a preceding cycle of operation was terminated. The operator will then press the starting button 101, thus closing the circuit which energizes the coil 102 of relay 99. The resultant energization of relay 99 will close switches 98c and 100c, the latter operating to establish the circuit to the motor 46'. The operator will keep the button 101 depressed until the motor has operated sufficiently to rotate the cam 37' to the point where the finger 89' is pushed out of the recess 91 and the microswitch 86 is closed. This will close the automatic motor circuit, making it possible to release the starting button 101. Operating upon the automatic circuit, the motor 46 will rotate the cam 37' through a complete cycle of operation. At a predetermined interval, shortly after the starting of the motor, the cam will be rotated sufficiently to lift the finger 89 out of the cam recess 90, closing the microswitch 85. This will close the circuit to the lights 91, which circuit has previously been set up by the closing of the switch 98c of relay 99. As the cam rotates, the lever 34' will be gradually moved in a counterclockwise direction as indicated by arrow 44', and this movement will be transmitted through arm 62 and link 25' to the arm 22, rotating the diaphragm holder through two f stop intervals. The movement of the diaphragm holder will be a decelerating one, resulting in the proportioning of the successive increments of closing to the corresponding increments of exposure period in the manner hereinbefore described in detail.

As the cam approaches the end of its cycle of movement, the finger 89 will drop into the cam recess 90, opening the microswitch 85 and thereby opening the light circuit and shutting off the illumination. Shortly thereafter, the finger 89 will drop into the hole 91 in the cam 37', opening the microswitch 86 and de-energizing the relay 99. The relay 99 will thereupon shift to the open position, and the attendant opening of the switch 100c will break the motor circuit, stopping the operation of the motor.

*Second modified form*

Figs. 14, 15, 16, 17 and 18 illustrate another modification of the invention, in which decelerating movement is developed by a barrel-type cam 37", and in which the adjustment for selecting the range of operation comprises a slot 45" in the crank arm 22", and a clip 106 adapted to be clamped to the arm 22" in selected positions of adjustment by means of a clamp bolt 32" extending through the slot 45" and a thumbnut 33". Pivoted at 107 to the clip 106 is one end of a tubular link 25" the other end of which is connected, through a yielding overtravel connection, to a cam follower which is referred to generally by the numeral 39". The yielding, overtravel connection comprises the coil spring 76". Coil spring 76" is received within the said other end of the link 25" and adapted to be compressed between the end member 108 thereof and a head 109 on a rod 111 which extends slidably in an opening in the end member 108. The cam follower 39" includes a collar 112 which is attached to a base 113 that is slidably mounted in ways 114 constituting the parallel web portions of a bracket 115. The cam follower 39" also includes a finger 116 which is slidably mounted in the collar 112 and base plate 113 and is urged yieldingly into mesh with the cam groove 38" of the cam 37", by means of a spring 117 under compression between the top of the collar 112 and a pin 118 in the finger 116. A knob 119 on the outer end of the finger 116 provides for lifting the finger 116 from the cam groove 38" and setting the cam follower 39" back to the starting position shown in full lines in Fig. 14 after a cycle of operation has been completed.

The bracket 115 has, at its respective ends, a pair of arms 120 and 121 in which the respective ends of the cam 37" are journalled. The arm 121 is provided with an extension 122 by means of which the bracket 115 may be secured to the camera head 36". Drive motor 46" drives the cam 37" through reduction gearing 48" the casing of which is secured to the arm 120 in order to support the motor. A limit switch which may be utilized for turning off the motor and the lights, is shown at 85". The movable contact of this switch may be provided with an extension 123 positioned to be engaged by the cam follower 39" at the end of the cycle of operation.

The cam groove 38" has a continuously decreasing pitch as indicated, in order to provide the desired decelerating movement. The slot 45" is laid out on a spiral curve which subtends, relative to a circumference of the lens axis, an angle which continuously increases toward the outer end of the slot. This provides for changing the effective average length of the arm 22" as the arm is adjusted to various starting positions. For a large aperture starting position, the lever arm will be relatively short and each increment of linear movement of the cam follower 39" will transmit a relatively high degree of rotary movement to the arm 22", so that a diaphragm holder may negotiate the relatively long intervals of adjustment between the low number f stop positions. On the other hand, when the arm 22" is adjusted to a small aperture starting position, the effective length of the arm will be adjusted to a relatively high value so that the amount of rotary movement transmitted to the arm will be relatively small for the relatively closely spaced intervals of the high f stops. It will now be apparent that the shape and position of the slot 45" determines the proper adjustment of the rate of transmission from the cam follower 39" to the arm 22" so that for each cycle of operation, the diaphragm holder will be moved through two f stop intervals, irrespective of the starting position. Also, it may be noted that the cam groove 38" determines the proper rate of deceleration to proportion the increments of aperture change to the increments of elapsed exposure period in accordance with the proportioning relation hereinbefore described.

One advantage of this form of the invention resides in the fact that the movement transmitting linkage is such that the deceleration rate may be applied uniformly to the arm 22" in all positions of adjustment thereof, with no elements of inaccuracy introduced by the linkage. Complete uniformity of application of the decelerating movement to the arm 22" in all of its positions of adjustment may be provided for by the proper design of the slot 45".

Figure 14:
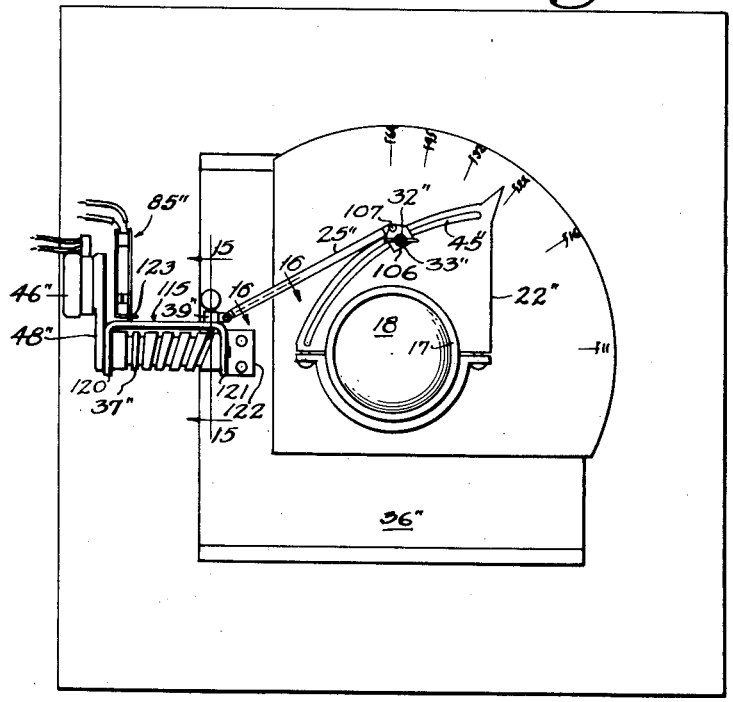
Fig. 14 is a front view of a camera embodying a modified form of the invention.

In the operation of the apparatus of Fig. 14, the arm 22" may be set to any selected starting position by loosening the nut 33", rotating the arm to the correct position, and then tightening the nut 33". It will be understood that during this adjustment, the cam follower 39" is at the starting position in the cam groove 38". The operation of the camera may then be started through control apparatus similar to that described as shown in Fig. 13, and will continue until the cam follower 39" opens the limit switch 85". The operator may then, at any time prior to the next operation, release the pin 116 from the groove 38" and set the follower 39" back to the starting position which is shown in full lines in Fig. 14.

Figures 15, 16, 17, 18:
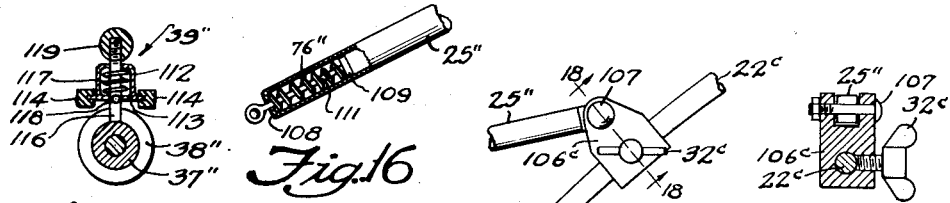
Fig. 15 is a detail sectional view taken on the line 15—15 of Fig. 14.
Fig. 16 is a detail sectional view taken on the line 16—16 of Fig. 14.
Fig. 17 is an enlarged detail of a portion of the motion transmitting linkage of Fig. 14 modified.
Fig. 18 is a detail sectional view taken on the line 18—18 of Fig. 17.

Figs. 17 and 18 show a modification of the mechanism of Fig. 14, in which the arm 22c, instead of being of plate form such as the arm 22'", with an arcuate slot therein, is in the form of an arcuate rod having the shape of the slot 45". It may be secured at its inner end to the holder 19 in any suitable manner. Instead of the clip 106, I provide a coupling block 106c having a bore in which the arm 22c is slidable, and having a set screw 32c for locking it to the arm 22c.

I claim:

Mechanism for constantly adjusting a camera diaphragm carried by a rotatable lens holder, so as to vary the size of a lens aperture defined by said diaphragm, comprising: a support, a motor, a cam rotated by said motor and having a working surface, a cam follower cooperating with said working surface, and means for transmitting the motion of said follower to said lens holder, comprising an arm attachable to said holder in a position projecting therefrom, a push-pull link connected to said arm, a lever comprising a tubular portion pivoted to said support to provide a fulcrum, and a shaft portion extending longitudinally through said tubular portion and having one end pivotally connected to said link, and a connection between said tubular portion and said cam follower for receiving movement therefrom, the other end of said shaft portion projecting from the fulcrumed end of said tubular portion and manually engageable for sliding said shaft portion longitudinally in said tubular portion and thereby varying the effective length of said lever between said follower connection and said link, said lever being disposed at an obtuse angle relative to said link, whereby a change in its effective length will effect an adjustment of the starting position of said arm and thus the size of said aperture at the beginning of any exposure operation, said working surface being so laid out as to effect the adjustment of said aperture at a speed constantly changing at a rate of change such that for each increment of aperture adjustment there is a transmission of light such as to provide optimum exposure conditions.

WILLIS N. URIE.

REFERENCES CITED

The following references are of record in the file of this patent:

UNITED STATES PATENTS

| Number | Name | Date |
|---|---|---|
| 738,654 | Brandweiner | Sept. 8, 1903 |
| 1,256,886 | Eberhard | Feb. 19, 1918 |
| 1,268,577 | Jones | June 4, 1918 |
| 1,542,409 | Readeker | June 16, 1925 |
| 1,658,361 | Tessier | Feb. 7, 1928 |
| 1,831,605 | Porter | Nov. 10, 1931 |
| 2,113,892 | Lehman | Apr. 12, 1938 |
| 2,149,743 | Newick | Mar. 7, 1939 |
| 2,307,479 | Annick | Jan. 5, 1943 |
| 2,489,840 | Newick | Nov. 29, 1949 |

FOREIGN PATENTS

| Number | Country | Date |
|---|---|---|
| 26,151 | Denmark | June 9, 1920 |